UNITED STATES PATENT OFFICE.

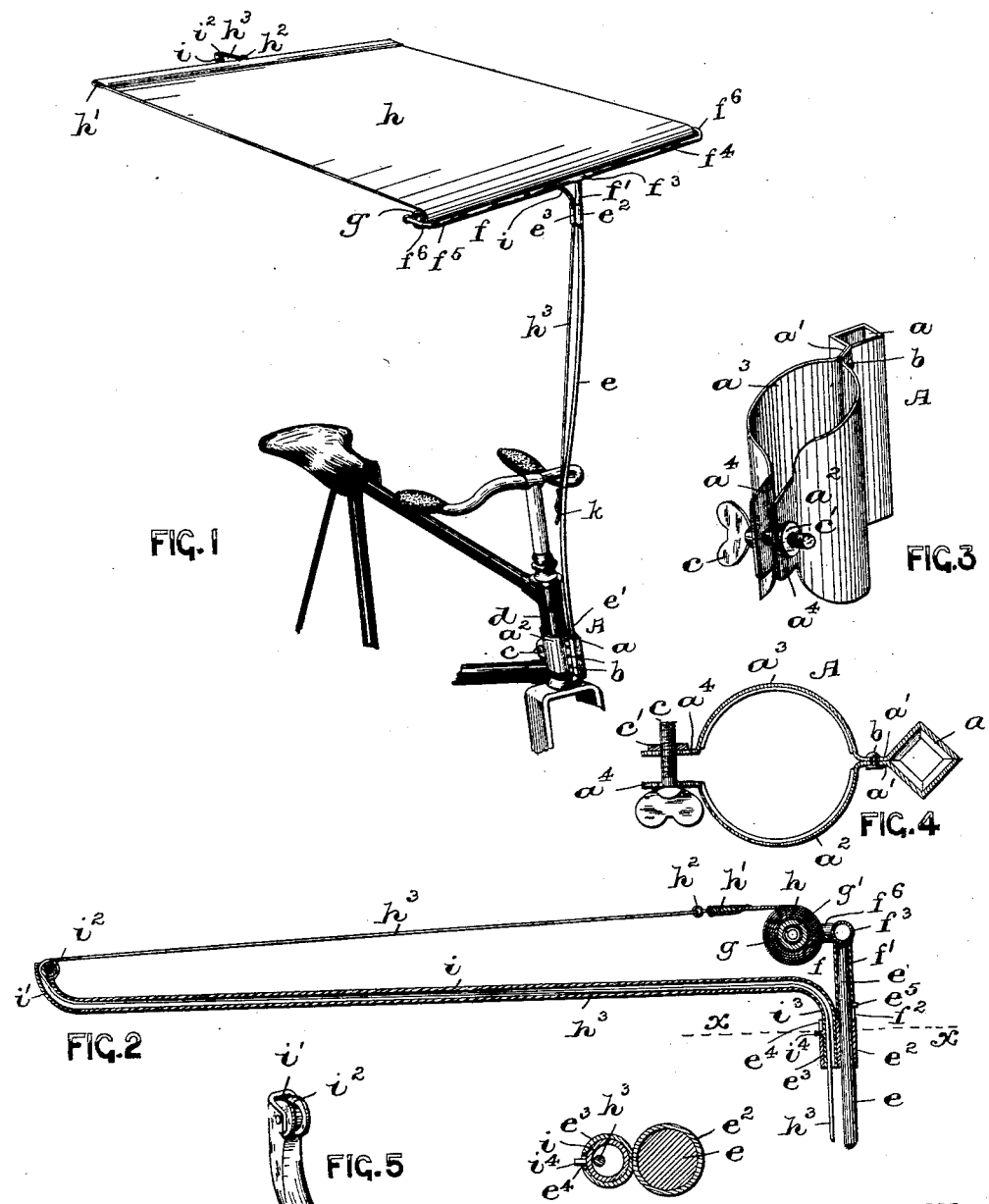
F. EHMANN.
CANOPY ATTACHMENT FOR BICYCLES.
No. 587,569. Patented Aug. 3, 1897.
INVENTOR:
FREDERICK EHMANN,
BY Fred E. Fraentzel,
ATTORNEY

FREDERICK EHMANN, OF NEWARK, NEW JERSEY.

CANOPY ATTACHMENT FOR BICYCLES.

SPECIFICATION forming part of Letters Patent No. 587,569, dated August 3, 1897.

Application filed April 24, 1896. Serial No. 588,850. (No model.)

*To all whom it may concern:*

Be it known that I, FREDERICK EHMANN, a citizen of the United States, residing at Newark, in the county of Essex and State of New Jersey, have invented certain new and useful Improvements in Awning or Canopy Attachments for Bicycles, &c; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My present invention relates to improvements in umbrella or awning attachments for bicycles and other vehicles; and the invention has for its object to provide an attachment of this class having a spring-actuated roller, to which is attached a suitable awning or canopy which can be rolled upon the roller or can be unrolled therefrom at the will of the rider without dismounting to produce a simply-constructed device which will greatly add to the comfort of the rider.

A further object of the invention is to provide a suitably-constructed support for the awning, and also a clamp for detachably arranging said support to the frame of a bicycle or other vehicle.

The invention therefore consists in the novel construction of awning attachment or canopy for bicycles and other vehicles, to be hereinafter fully set forth, and also in the novel arrangements and combinations of parts, such as will be fully described in the accompanying specification and finally embodied in the clauses of the claim.

In the annexed drawings, which form part of this specification, Figure 1 is a perspective view of a portion of a bicycle-frame provided with an awning or canopy attachment embodying the principles of my present invention. Fig. 2 is a longitudinal vertical section of portions of the supporting-frame and the awning and its spring-roller rotatively arranged in said frame. Fig. 3 is a perspective view of a clamp adapted to be connected with the vehicle-frame, provided with a receiving-socket for the reception of the awning-supporting frame; and Fig. 4 is a top view of the same. Fig. 5 is a perspective view of the forward end of the tubular supporting-frame for the awning, provided with a grooved wheel in its free end; and Fig. 6 is a cross-section taken on line $x$ in Fig. 4.

Similar letters of reference are employed in all of the above-described views to indicate like parts.

In said drawings, A indicates a suitable clamp, preferably made from sheet metal, said clamp being formed with a socket $a$, which is of a larger cross-section at the top than at the bottom, as will be clearly seen from Fig. 4. The sheet-metal portions $a'$ are suitably secured together by means of pins or rivets $b$. From said portions $a'$ extend two clamping-leaves $a^2$ and $a^3$, which can be made to embrace the member $d$ of the frame of the bicycle or any other part of the frame of any other vehicle, said parts being firmly clamped in position thereon by means of a bolt $c$ and a nut $c'$, arranged in perforated ears or lugs $a^4$, extending from said clamping-leaves $a^2$ and $a^3$, as clearly represented in the several figures of the drawings. When said clamp A has been securely attached on the frame of the vehicle, then said socket $a$ is adapted to receive the correspondingly-shaped lower end $e'$ of the awning or canopy supporting post $e$, as clearly illustrated in Fig. 1. Said post $e$ extends upwardly in front of the steering-post of the bicycle, and it is provided with a sleeve $e^2$. Said sleeve $e^2$, which is secured to said post $e$ in any suitable and well-known manner, is also provided with a rearwardly-extending ring or sleeve-like socket $e^3$, provided with a slot $e^4$ for the purposes to be more fully explained hereinafter. Said post $e$ is also provided with a small pin or projection $e^5$, adapted to fit into a slot $f^2$ in the awning-roller-carrying frame $f$. Said frame comprises therein a tubular supporting-post $f'$, adapted to be fitted on the upper portion of the post or rod $e$, and has a T-piece $f^3$, in the opposite ends of which are secured the rods $f^4$ and $f^5$, substantially as illustrated in Fig. 1.

Each rod $f^4$ and $f^5$ is bent, as at $f^6$, and is provided with suitable bearings for the journal-pins of a spring-roller $g$, onto which the awning or canopy $h$ can be rolled, as will be clearly understood. Said roller $g$ is hollow, and is provided with a spring $g'$, (see Fig. 2,) which actuates certain mechanism connected therewith in the manner of the well-known constructions of Hartshorn shade-rollers.

The awning or canopy $h$ is provided at its free end with a cross-bar $h'$, to which is secured a suitable ring or eye $h^2$ and a rope $h^3$.

As will be seen from an inspection of Fig. 2, a grooved wheel $i^2$ is rotatively arranged in the upwardly-projecting end $i'$ of a tubular bar $i$, said bar being also provided with a downwardly-projecting end $i^3$, by means of which it can be arranged in the said sleeve-like socket $e^3$, as shown. To hold said bar $i$ in a fixed position, it is provided with a pin or projection $i^4$, which slips down into the slot $e^4$ in said socket $e^3$ when the end $i^3$ of the rod or bar $i$ is inserted in said socket, and thereby prevents any lateral movement of the said bar $i$ in its supporting-socket, as will be clearly evident. The rope $h^3$, which is attached to the bar $h'$ of the awning or canopy $h$, as has been stated, is passed over said grooved wheel $i^2$ and into and through the said tubular rod $i$, having its free end detachably secured to a suitable cleat $k$ or other holding device on the rod or post $e$.

After the several parts of the supporting-frame have been arranged in position on the frame of the vehicle and the rope $h^3$ is disconnected from the cleat $k$ the spring $g'$ in the roller $g$ will cause the awning or canopy $h$ to be rolled upon the said roller $g$, as represented in Fig. 2; but when the rider desires to spread the awning all that is necessary is to pull on the rope $h^3$ and he can adjust the awning above his person to any desired distance, and can retain it in such adjusted position by simply fastening the end of the rope $h^3$ to the cleat $k$.

Should the rider desire to dispense with the awning, the rope is unfastened from the cleat $k$ and the spring $g'$ causes the roller $g$ to revolve in its bearings in the frame $f$, while the awning or canopy $h$ is rolled upon the roller $g$.

The operations of the several parts of the device are very simple and can be manipulated without dismounting from the bicycle.

I do not wish to be understood as limiting my invention to the exact arrangements and combinations of the several parts as herein shown and described, for they may be varied without departing from the scope of my invention, the essential feature of which is a supporting-frame for an awning or canopy for bicycles or other vehicles, said awning or canopy being adapted to be rolled upon a spring-roller in said frame, and this I claim, broadly.

Having thus described my invention, what I claim is—

1. The combination, with the frame of a bicycle, of a clamp secured to said frame, having a receiving-socket, an awning or canopy support in said socket, comprising therein, a post $e$, a roller-carrying frame $f$ on said post, a spring-roller in said frame, a tubular supporting-bar $i$, an awning or canopy on said roller, and a rope connected with said awning or canopy and passing over a grooved wheel on said bar $i$, and through said bar, substantially as and for the purposes set forth.

2. The combination, with the frame of a bicycle, of a clamp secured to said frame, having a receiving-socket, an awning or canopy support in said socket, comprising therein, a post $e$, a sleeve $e^2$ on said post, having a socket $e^3$, a roller-carrying frame on said post $e$, a spring-roller in said frame, a tubular supporting-bar $i$ in said socket $e^3$, a grooved wheel in the end of said bar $i$, an awning or canopy on said roller, a rope connected with said awning or canopy, passing over said grooved wheel and into and through said tubular bar $i$, and means for attaching the free end of said rope to said post $e$, substantially as and for the purposes set forth.

In testimony that I claim the invention set forth above I have hereunto set my hand this 21st day of April, 1896.

FREDERICK EHMANN.

Witnesses:
FREDK. C. FRAENTZEL,
WM. H. CAMFIELD, Jr.